United States Patent
Weems et al.

(10) Patent No.: US 6,167,618 B1
(45) Date of Patent: Jan. 2, 2001

(54) METHOD FOR REPAIRING VERTICAL WELDS IN A BOILING WATER REACTOR SHROUD USING A CLAMP WITH ECCENTRIC PINS

(75) Inventors: Sterling J. Weems, Saint Petersburg; William E. Sylvester, Vero Beach, both of FL (US)

(73) Assignee: MPR Associates, Inc., Alexandria, VA (US)

( * ) Notice: Under 35 U.S.C. 154(b), the term of this patent shall be extended for 0 days.

(21) Appl. No.: 09/275,548

(22) Filed: Mar. 24, 1999

(51) Int. Cl.[7] .................................................. B23P 15/26
(52) U.S. Cl. ............................. 29/890.031; 29/890.054; 29/402.14; 376/260
(58) Field of Search .................... 29/890.031, 890.03, 29/890.054, 890.057, 402.09, 402.14; 376/260

(56) References Cited

U.S. PATENT DOCUMENTS

| 5,392,322 | 2/1995 | Whitling et al. . |
| 5,402,570 | 4/1995 | Weems et al. . |
| 5,502,754 | 3/1996 | Erbes . |
| 5,521,951 | 5/1996 | Charnley et al. . |
| 5,577,082 | 11/1996 | Weems et al. . |
| 5,600,689 | 2/1997 | Weems et al. . |
| 5,600,690 | 2/1997 | Weems et al. . |
| 5,623,526 | 4/1997 | Wivagg . |
| 5,675,619 | 10/1997 | Erbes et al. . |
| 5,729,581 | 3/1998 | Loock et al. . |
| 5,737,379 | 4/1998 | Erbes . |
| 5,781,603 | 7/1998 | Wivagg . |
| 5,793,828 | 8/1998 | Wigagg et al. . |
| 5,803,686 | 9/1998 | Erbes et al. . |
| 5,839,192 | * 11/1998 | Weems et al. .................. 29/890.031 |
| 5,905,771 | 5/1999 | Erbes et al. . |
| 5,964,029 | * 10/1999 | Weems et al. .................. 29/890.031 |

* cited by examiner

*Primary Examiner*—Irene Cuda

(57) ABSTRACT

A method of repairing a crack in a boiling water reactor shroud with a clamp having pins eccentrically mounted on disks connected by a structural member includes inserting the pins into openings formed in the shroud on opposite sides of the weld and turning the disks to rotate the pins toward the weld such that edges of the holes are engaged by the pins to transmit loads from the shroud to the structural member rather than the weld. A locking mechanism using set screws can be used to lock the disks in a desired rotational position relative to the clamp.

13 Claims, 10 Drawing Sheets

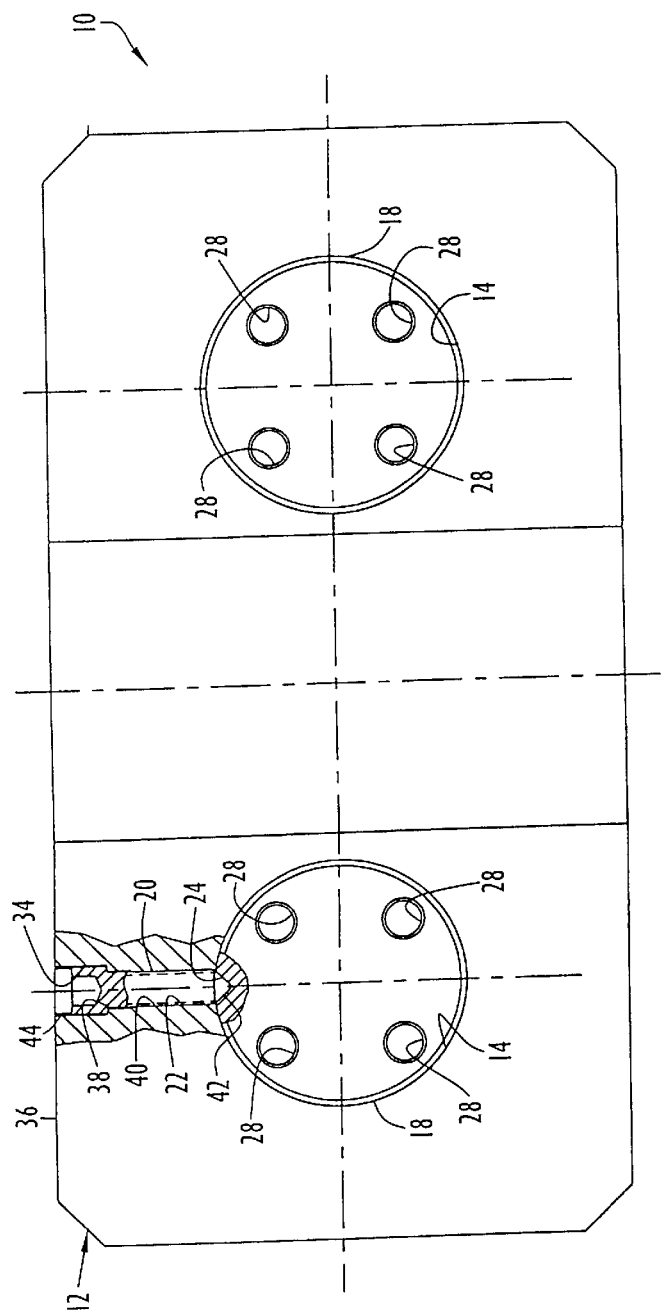
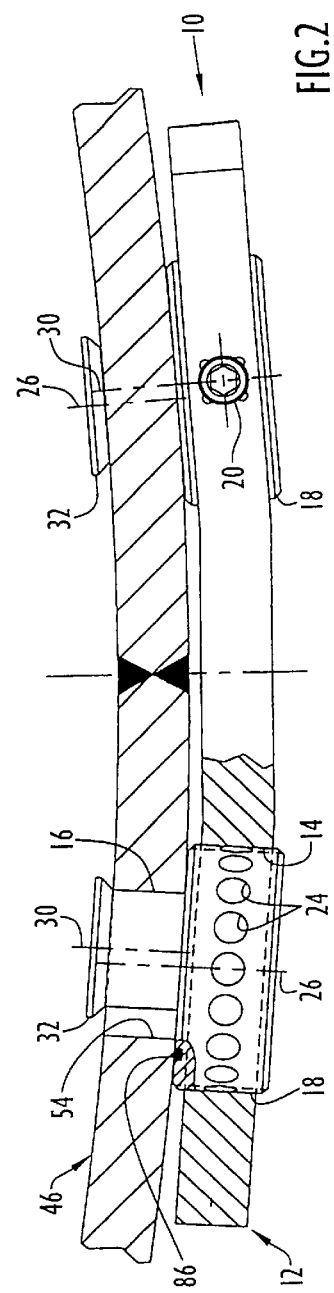
FIG.1
FIG.2

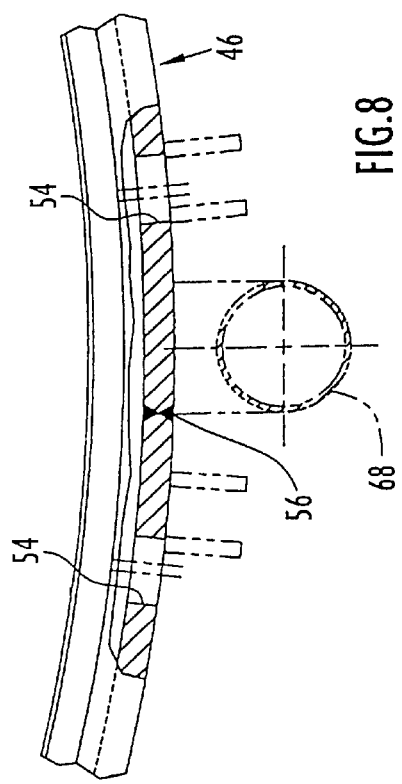
FIG.8
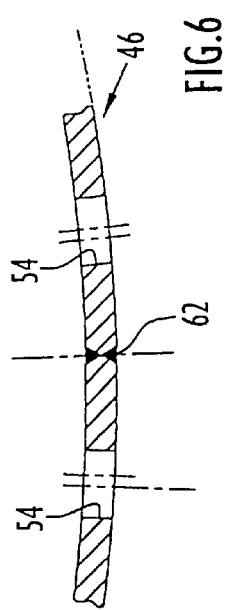
FIG.9
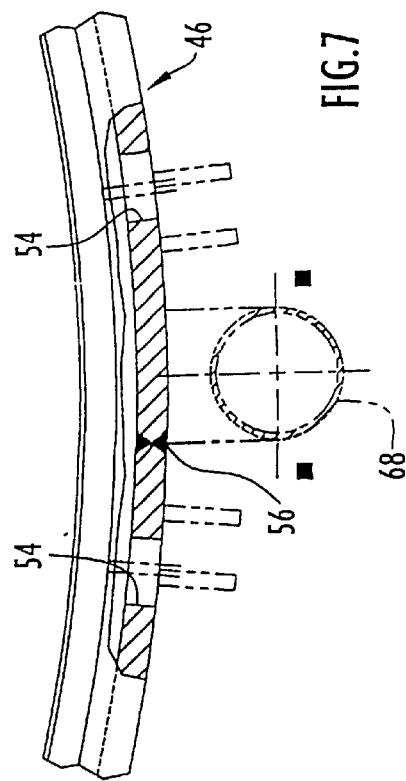
FIG.6
FIG.7

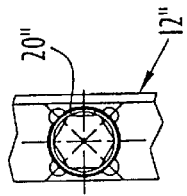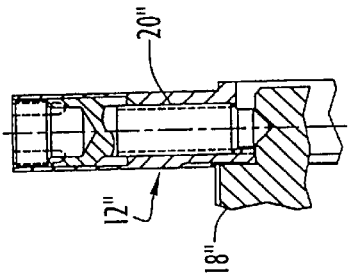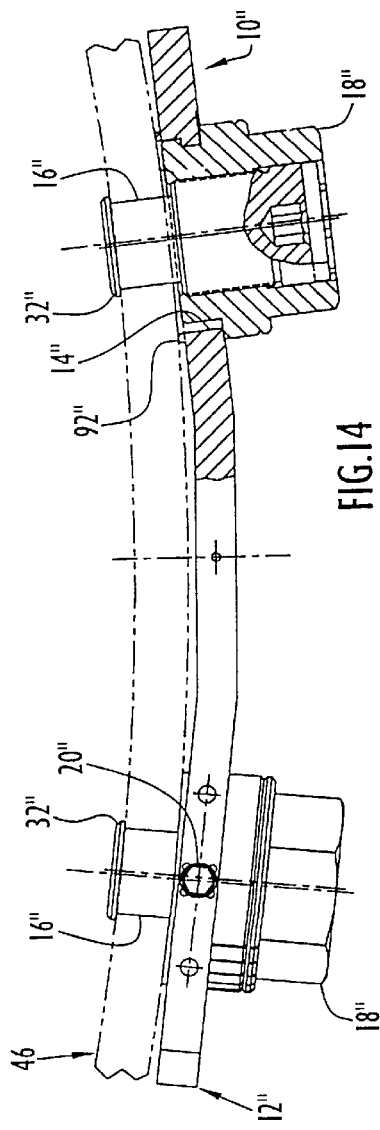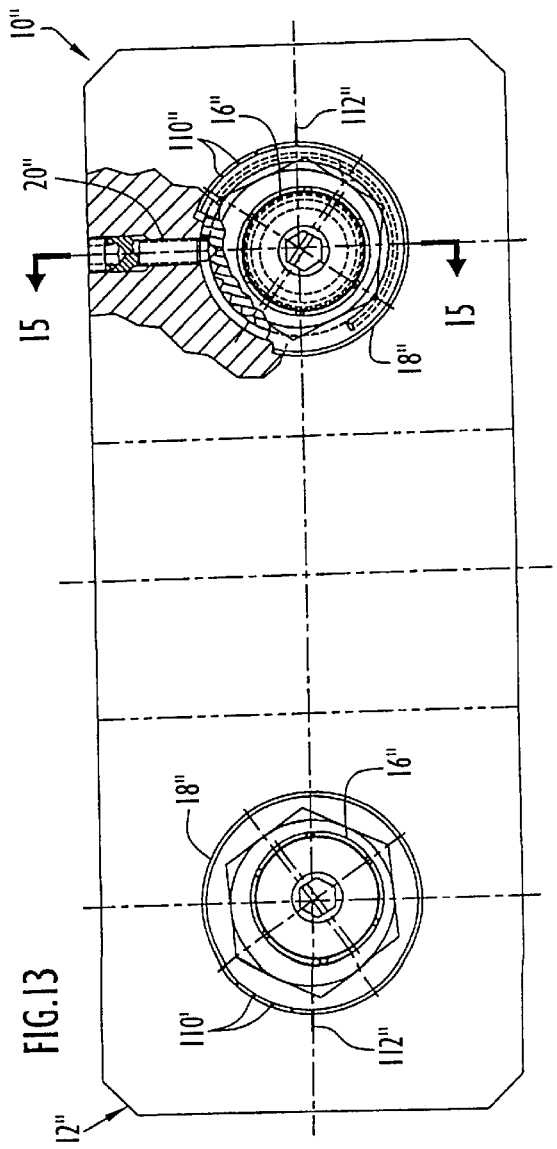

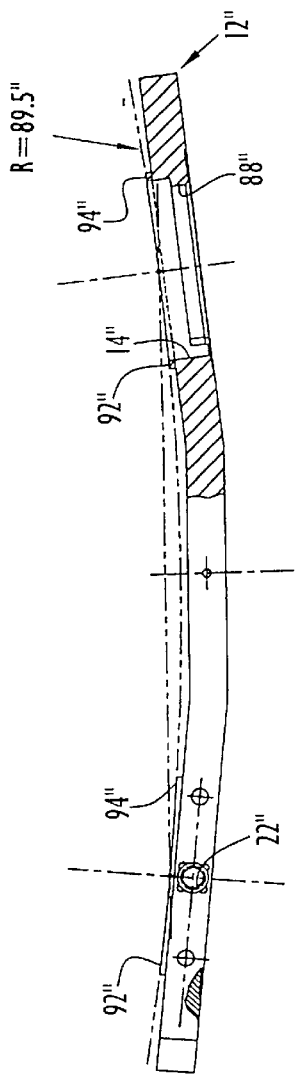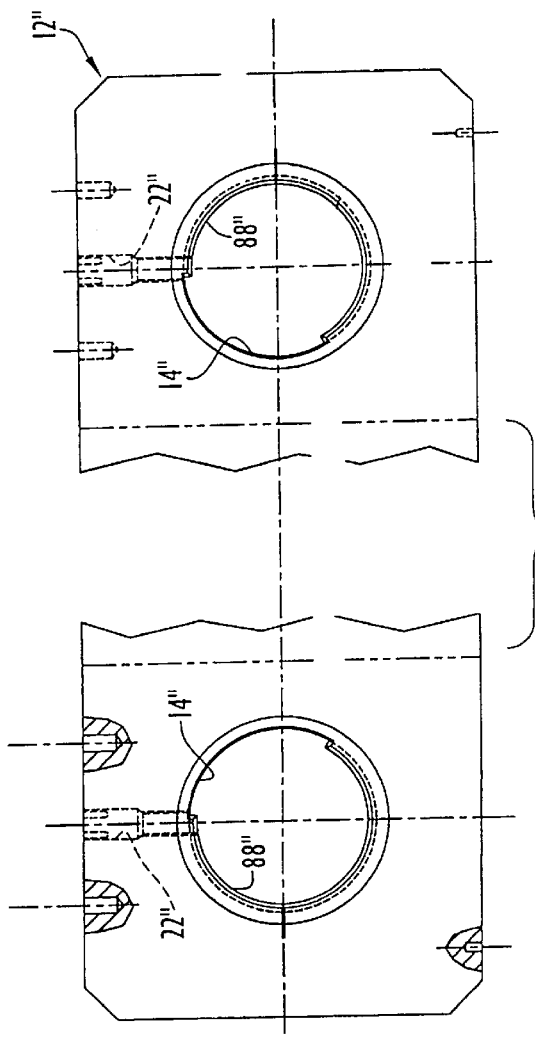

METHOD FOR REPAIRING VERTICAL WELDS IN A BOILING WATER REACTOR SHROUD USING A CLAMP WITH ECCENTRIC PINS

BACKGROUND OF THE INVENTION

1. Field of the Invention

The present invention relates generally to boiling water reactors and, more particularly, to a method and apparatus for repairing welds in a boiling water reactor shroud.

2. Discussion of the Related Art

Boiling water reactor shrouds are disposed concentrically within reactor vessels to divide the flow of coolant water through the reactor vessels and to structurally support and align the fuel assemblies, steam separator assemblies and control rod guide tubes. The shrouds are generally cylindrical and are typically formed of multiple arcuate steel plates joined by welds along their abutting vertical and horizontal edges. After periods of use, cracking of the shroud within heat affected zones of the welds tends to occur as a result of corrosion, radiation and stress. When excessive cracking of the welds occurs, the shroud must either be replaced or repaired.

U.S. Pat. No. 5,402,570 to Weems et al, the disclosure of which is incorporated herein by reference, describes a method of repairing boiling water reactor core shrouds having horizontal cracks in heat affected zones of welds by securing plural tie rods in vertical orientation about the periphery of the cracked shroud to axially compress the shroud and thereby urge the opposing surfaces of the horizontal cracks toward one another. Lateral or radial spacers or bumpers may also be installed between the inner surface of the reactor vessel and the outer surface of the shroud and/or tie rods to resist horizontal seismic loads and to hold the shroud in place relative to the vessel wall in the event of cracking along any horizontal weld during a seismic event.

While the tie rod repair described in U.S. Pat. No. 5,402,570 provides an acceptable method for mitigating the consequences of cracking along horizontal welds, there exists a need for a vertical weld repair which can be used alone or in combination with tie rods to mitigate the consequences of cracking along vertical welds in a boiling water reactor core shroud.

SUMMARY OF THE INVENTION

Accordingly, it is a primary object of the present invention to provide a method and apparatus for repairing cracked vertical welds in a boiling water reactor core shroud.

The present invention is generally characterized in a method of repairing a weld in a boiling water reactor shroud using a clamp with a pair of pins connected by a structural member such as a plate. The method includes the steps of forming a pair of openings in the shroud on opposite sides of the weld, inserting a pin into each opening in the shroud, and moving at least one of the pins toward the weld from a rest position to an engaged position by rotating the pin about an axis of rotation offset from a central longitudinal axis of the pin so that the pins are positioned to transmit loads from the shroud to the structural member. The pins preferably protrude from disks that are rotatably mounted on the structural member and include circumferentially spaced recesses for receiving set screws to lock the pins in the engaged position. The pins can also be threaded into the disks and provided with inboard flanges so that the flanges can be tightened against the inner surface of the shroud by turning the pins. Alternatively, the flanges can be mounted on bolts extending through the pins. The openings formed in the shroud can be circular or of decreasing diameter in the direction of the weld. If the openings extend through the shroud, seals can be positioned between the weld repair clamp and the outer surface of the shroud to prevent leakage from the openings.

Some of the advantages of the vertical weld repair according to the present invention are that the repair can be performed without unloading the reactor fuel, that the repair can be performed in combination with other types of repairs such as those involving installation of tie rods, that the repair can be designed to meet all operating and design basis loads for a reactor, that the repair eliminates the need to inspect the repaired weld thereby minimizing in-service inspection of the shroud, that the repair can mitigate the effects of cracking along welds without preloading, that the repair can accommodate cold feedwater injection, that the repair provides installation clearance take-up while holding opposed surfaces of a crack together for normal operation, that the repair can accommodate cracking well away from the weld as needed, that stresses on the shroud are minimized, that interference with reactor internals such as the top guide and core plate is minimized, that welds behind core spray piping and other structures in the reactor vessel can be repaired, that the repair will not loosen in service or create any shroud leak paths, and that the repair can be performed using no loose pieces in a cost effective and timely manner.

Other objects and advantages of the present invention will become apparent from the following description of the preferred embodiments taken in conjunction with the accompanying drawings, wherein like parts in each of the several figures are identified by the same reference numerals. Parts identified by a reference numeral followed by one or more primes are similar to parts identified by the same reference numeral without primes unless indicated otherwise.

BRIEF DESCRIPTION OF THE DRAWINGS

FIG. 1 is an inboard view of a weld repair apparatus or clamp for repairing a vertical weld in a boiling water reactor shroud according to the present invention.

FIG. 2 is a top view of the weld repair clamp of FIG. 1 installed on a boiling water reactor shroud.

FIG. 6 is a fragmentary sectional view of the modified core shroud taken through lines 6—6 in FIG. 4.

FIG. 7 is a fragmentary sectional view of the modified core shroud taken through line 7—7 in FIG. 4

FIG. 8 is a fragmentary sectional view of an alternate embodiment of a modification of a core shroud according to the present invention taken through line 7—7 in FIG. 4.

FIG. 9 is a side view of a modified opening which can be formed in the core shroud as part of the weld repair according to the present invention.

FIG. 13 is an inboard view of another modification of a weld repair clamp for repairing vertical welds in a boiling water reactor shroud according to the present invention.

FIG. 14 is a fragmentary top view, partly in section, of the modified weld repair clamp of FIG. 13 installed on a core shroud.

FIG. 15 is a fragmentary sectional view of the modified weld repair clamp taken through line 15—15 in FIG. 13.

FIG. 16 is a fragmentary top view of the modified weld repair clamp as shown in FIG. 15.

FIG. 17 is an inboard view, broken longitudinally, of a clamp plate that forms part of the modified weld repair clamp of FIG. 13.

FIG. 18 is a top view, partly in section, of the clamp plate shown in FIG. 17.

DETAILED DESCRIPTION OF THE PREFERRED EMBODIMENTS

Figure 3:
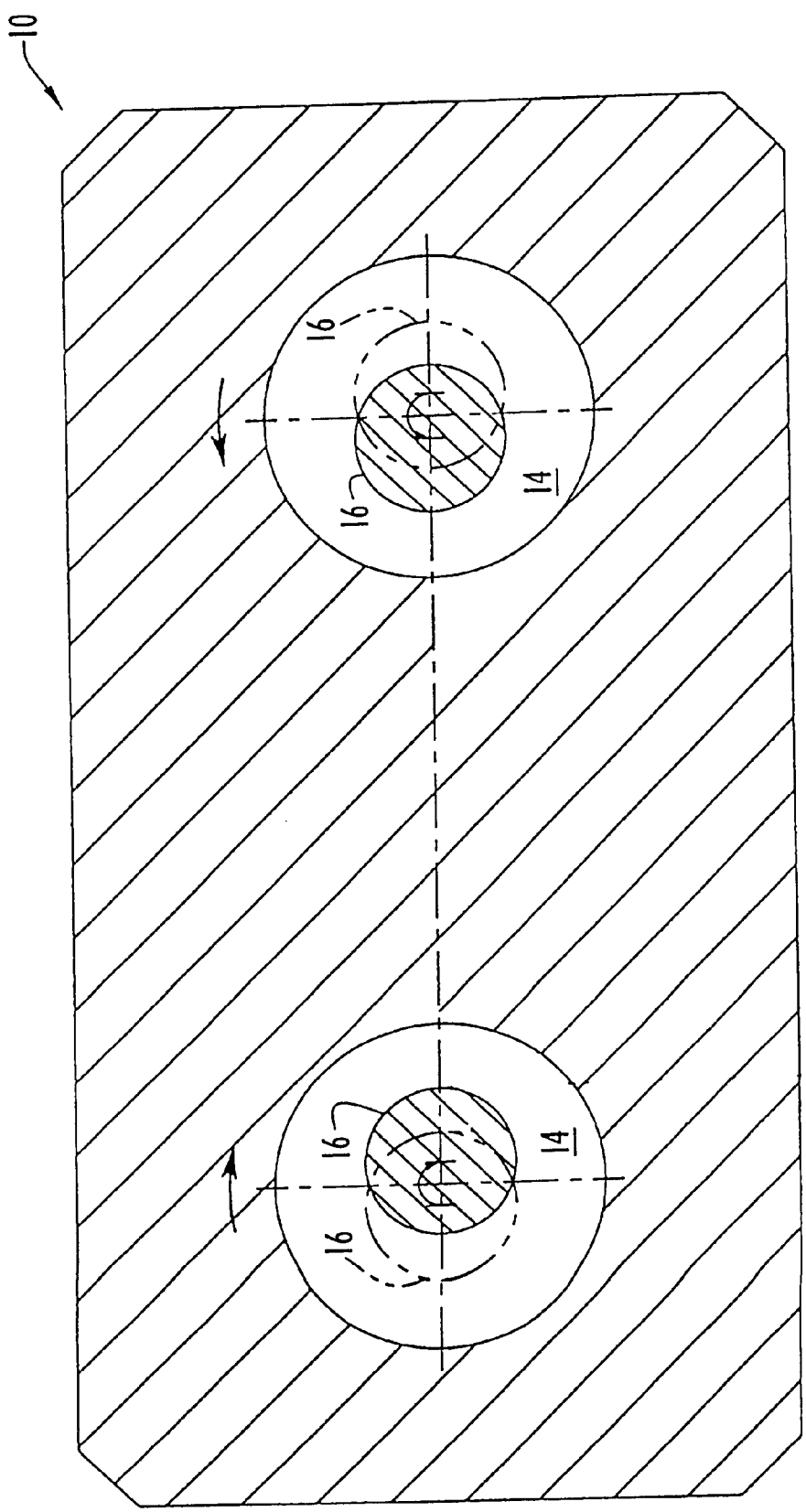
FIG. 3 is a sectional view of the weld repair clamp of FIG. 1 illustrating operation of the clamp.

A weld repair apparatus or clamp 10 for repairing vertical welds in a boiling water reactor shroud according to the present invention, as illustrated in FIGS. 1–3, includes a plate 12 with a pair of holes 14 formed therethrough for placement on opposite sides of the weld, a pair of pins 16 mounted eccentrically on disks 18 threaded within the holes, and locking members in the form of a pair of pointed set screws 20 which extend through threaded openings 22 in the plate to engage recesses 24 in the disks thereby preventing rotation of the disks once the clamp has been installed. Opposite ends of plate 12 are bent inwardly at a slight angle relative to a central portion of the plate to conform generally to the outer circumference of the shroud. Holes 14 are formed through the bent ends of the plate and are internally threaded. Disks 18 are cylindrical in configuration with a diameter to fit within holes 14 and axes of rotation 26 corresponding to respective centers of the holes. External threads are formed at one end of the outer surface of each disk 18 to threadedly engage the internally threaded surface of a corresponding hole 14 such that the disks are threaded within the holes. A plurality of recesses 24 are formed at angularly spaced locations about the outer circumference of the disks to receive pointed set screws 20, and a plurality of sockets or recesses 28 are formed in the outboard face of the disk in an arrangement to couple with a tightening tool such as a spanner wrench. Alternatively, lugs or the like can protrude from the outboard face of the disk to serve as coupling features with a tightening tool.

Pins 16 are mounted eccentrically on inboard faces of disks 18 such that longitudinal axes 30 of the pins are offset from the rotational axes 26 of the disks. The pins protrude from the disks in the inboard direction and terminate at flared ends or flanges 32.

Set screw openings 22 are formed through plate 12 in radial relation to holes 14 and are shown to include a cylindrical bolt head recess 34 extending vertically downward from the top edge 36 of the plate to a radial step or shoulder 38 connecting the recess with a threaded portion or bore 40 which extends downwardly from the recess to the hole. Set screws 20 are threaded into openings 22 and include pointed ends 42 which extend downwardly from the screws to be received within the recesses in the outer circumference of disks 18 when the screws are tightened. Locking cups 44 at the opposite ends of the screws allow the screws to be crimped if desired.

The repair method according to the present invention is preferably performed upon the first indication of cracking in the heat affected zones of vertical welds in a boiling water reactor core shroud, for example during or after a periodic inspection of the shroud. The repair method involves installing a weld repair clamp on the shroud in situ, either alone or in combination with tie rods in the case of horizontal cracking, while the reactor is shut down.

Figure 5:
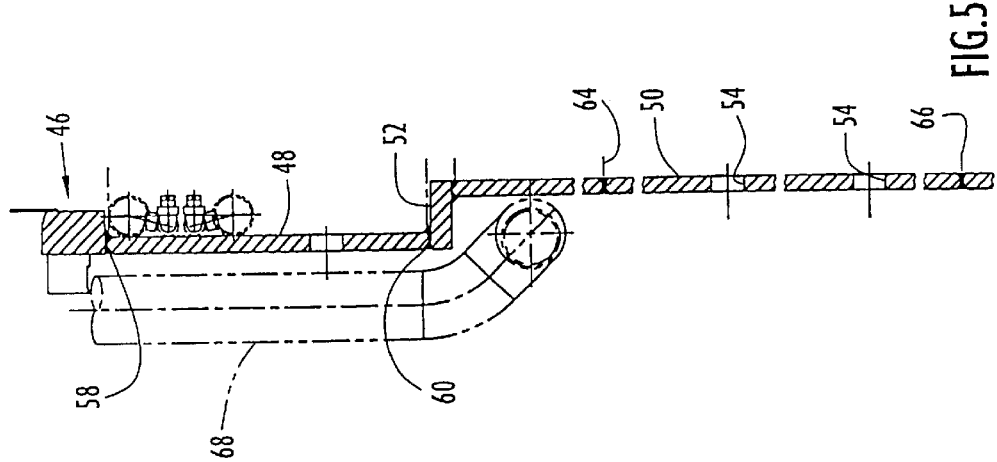
FIG. 5 is a fragmentary sectional view of the modified core shroud taken through line 5—5 in FIG. 4.
Figure 4:
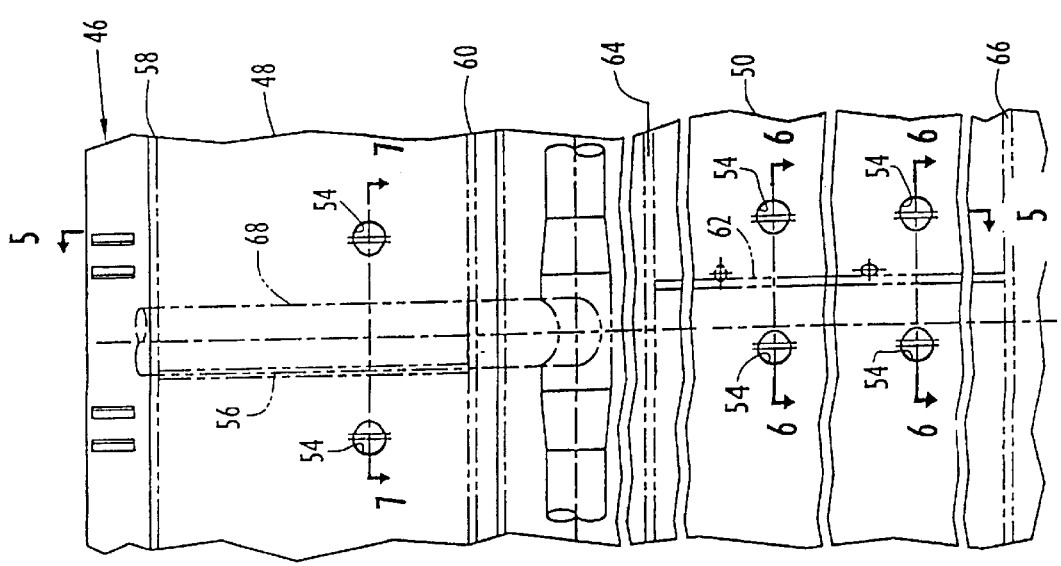
FIG. 4 is a fragmentary side view of a cylindrical core shroud for a boiling water reactor illustrating modification of the shroud to receive a weld repair clamp according to the present invention.

Specifically, installation of a weld repair clamp 10 according to the present invention, as illustrated in FIGS. 4–11, involves forming a pair of openings in the shroud on opposite sides of the cracked weld, lowering the weld repair clamp into the annular space between the shroud and the reactor vessel with pins rotated away from one another, inserting the pins through the holes, rotating the pins toward one another such that the pins engage edges of the holes to prevent the cracked weld from opening, and locking the pins in the engaged position. As best seen in FIGS. 4 and 5, shroud 46 includes upper and lower cylindrical sections 48 and 50 connected by a horizontal shelf 52. As described in detail in U.S. Pat. No. 5,402,570, the disclosure of which is incorporated herein by reference, upper and lower cylindrical sections of a shroud are typically made up of multiple levels of arcuate plates welded along their respective horizontal and vertical edges to form a cylindrical structure. In accordance with the present invention, openings can be formed through the shroud on opposite sides of any of the vertical welds joining adjacent shroud plates. In FIGS. 4 and 5, for example, a first pair of openings 54 are shown formed through the shroud on opposite sides of a vertical weld 56 between the first and second horizontal welds 58 and 60, and second and third pairs of openings 54 are shown formed at different elevations along a vertical weld 62 between the fourth and fifth horizontal welds 64 and 66. The openings can be centered about the weld such that the openings are spaced an equal distance from the weld, or the openings can be offset relative to the weld such that openings are spaced at different or unequal distances from the weld. For example, in FIG. 6, the second and third pairs of openings 54 are shown spaced equidistant from the vertical weld 62. In FIGS. 7 and 8, on the other hand, the openings 54 are shown at different distances from the weld 56 to clear a vertical core spray pipe 68 that extends downwardly along the exterior of the upper cylindrical section of the shroud adjacent the vertical weld. The spacing between the openings can be varied dependent upon the location of the repair but will typically range from about 12 inches center-to-center to about 20 inches center-to-center. The openings can be of any suitable shape or size including, but not limited to, circular or round holes of various diameters or a pear shape of decreasing diameter in the direction of the weld, as shown in FIG. 9, wherein the openings 54 include a first generally circular portion 70 having a first diameter larger than the pin diameter and a second generally circular contoured portion 72 intersecting the first portion and having a second diameter about the same as the first diameter to provide a contoured fit therefor. As best seen in FIG. 4, the pear shaped holes are arranged such that the smaller diameter second portion faces the weld so that the pins essentially snap into place within the second portion when the pins are rotated toward the weld. The contoured shape also reduces bearing stress caused by seating and loading of the pin. In an exemplary embodiment, the first portion has a diameter of about 1.563 inch and the second portion has a center of curvature offset about 0.540 inches from the center of the first portion and a diameter of about 1.265 inch.

The weld repair clamp 10 is preferably lowered into the annular space between the reactor vessel 74 and the core shroud 46 in an assembled state using conventional long handled tools and is positioned against the shroud with pins 16 extending through the preformed openings 54. In an exemplary embodiment, suitable for most vertical welds, the clamp plate 12 is about 1.5 inches thick and about 24 inches long with the holes 14 formed therein being about 5 inches in diameter and spaced about 12 inches apart center-to-center. The centerline spacing of the holes 14 in plate 12 is preferably slightly less than the centerline spacing of openings 54 in shroud 46 to insure engagement of the pins as the pins are rotated. Pins 16 have a length corresponding approximately to the thickness of a shroud plate (e.g., about 1.5 inches) with an outer diameter smaller than the openings 54 in the shroud (e.g., about 2.5 inches) and a flange of slightly larger diameter (e.g., about 3.0 inches). As mentioned above, the pins are mounted eccentrically on the disks, for example about 0.25 inches from the axis of rotation of the disks so that the total range of pin travel or stroke is about 0.5 inch for each pin and about 1.0 inch combined.

Figure 11:
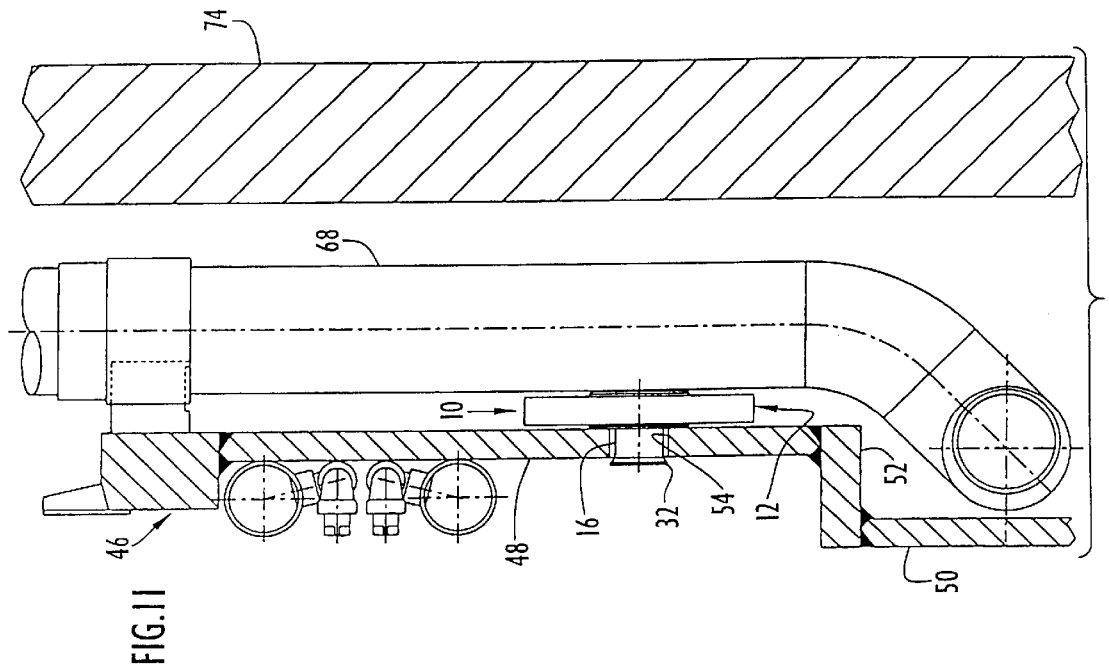
FIGS. 10 and 11 are a fragmentary top view and a fragmentary side view, respectively, of a boiling water reactor repaired using a clamp as shown in FIGS. 1–3.
Figure 10:
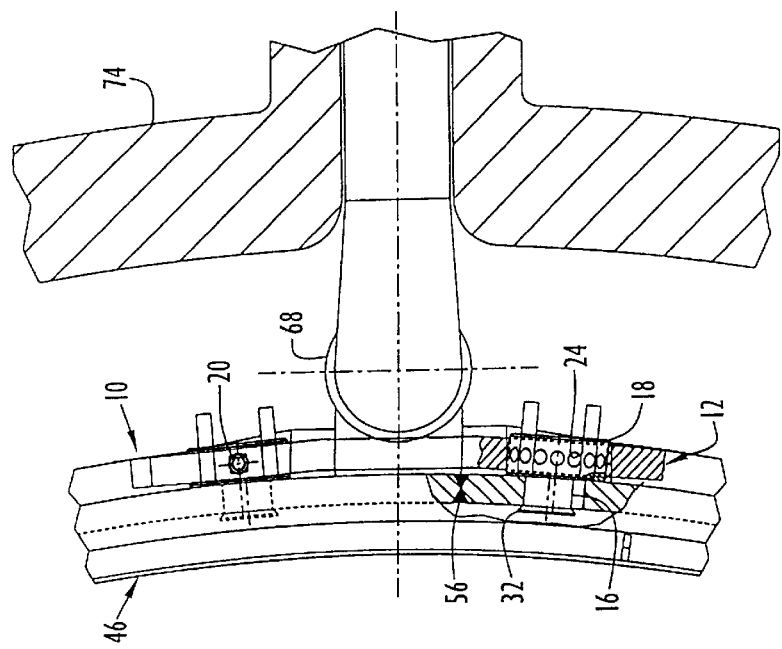

If the vertical weld is obstructed by core spray piping, a weld repair clamp having a slightly thinner plate (e.g., about 1.125 inches thick) and larger hole spacing (e.g., about 19 inches center-to-center) can be positioned between the core spray piping 68 and the shroud 46 as shown in FIGS. 10 and 11. One way of accomplishing this is to position the clamp plate with only one of the pins installed therein so that the end of the plate without a pin can slide between the piping and the shroud and to install the omitted pin after the plate has been positioned. In this case, the omitted pin can have a zero eccentricity to simplify installation and the other pin can be configured with sufficient eccentricity (e.g., about 0.5 inch offset) to tighten the clamp.

In the case of the weld repair clamp 10 shown in FIGS. 1–3, pins 16 can be rotated using a spanner wrench or the like to engage the cylindrical recesses 28 on the outboard face of each disk 18. Rotation of pins 16 toward one another takes up all installation clearances and tolerances and, in the engaged position, flanges 32 at the inboard ends of the pins overlap edges of the shroud openings 54 to prevent radially outward movement of the clamp relative to the shroud. In the case of a pin with an eccentricity of 0.25 inch, the maximum adjustment is about 0.5 inch per pin. The disks are preferably locked in the engaged position by tightening pointed set screws 20 such that the point at the end of each set screw is received within one of the recesses 24 formed about the circumference of the disk to prevent rotation of the disk. Locking cups 44 on the set screws can be crimped in a conventional manner to prevent loosening of the clamp over time.

In operation, pins 16 of the clamp engage inside edges of the openings 54 formed in the shroud so that structural loads which would normally cause the crack to open are instead transferred to clamp plate 12 by the pins thereby providing a structural load path around the weld which helps prevent the cracked weld from opening due to pressure loads inside the shroud. A single clamp is believed to be sufficient for any shroud shell vertical weld, however, multiple clamps can be used.

Figure 12:
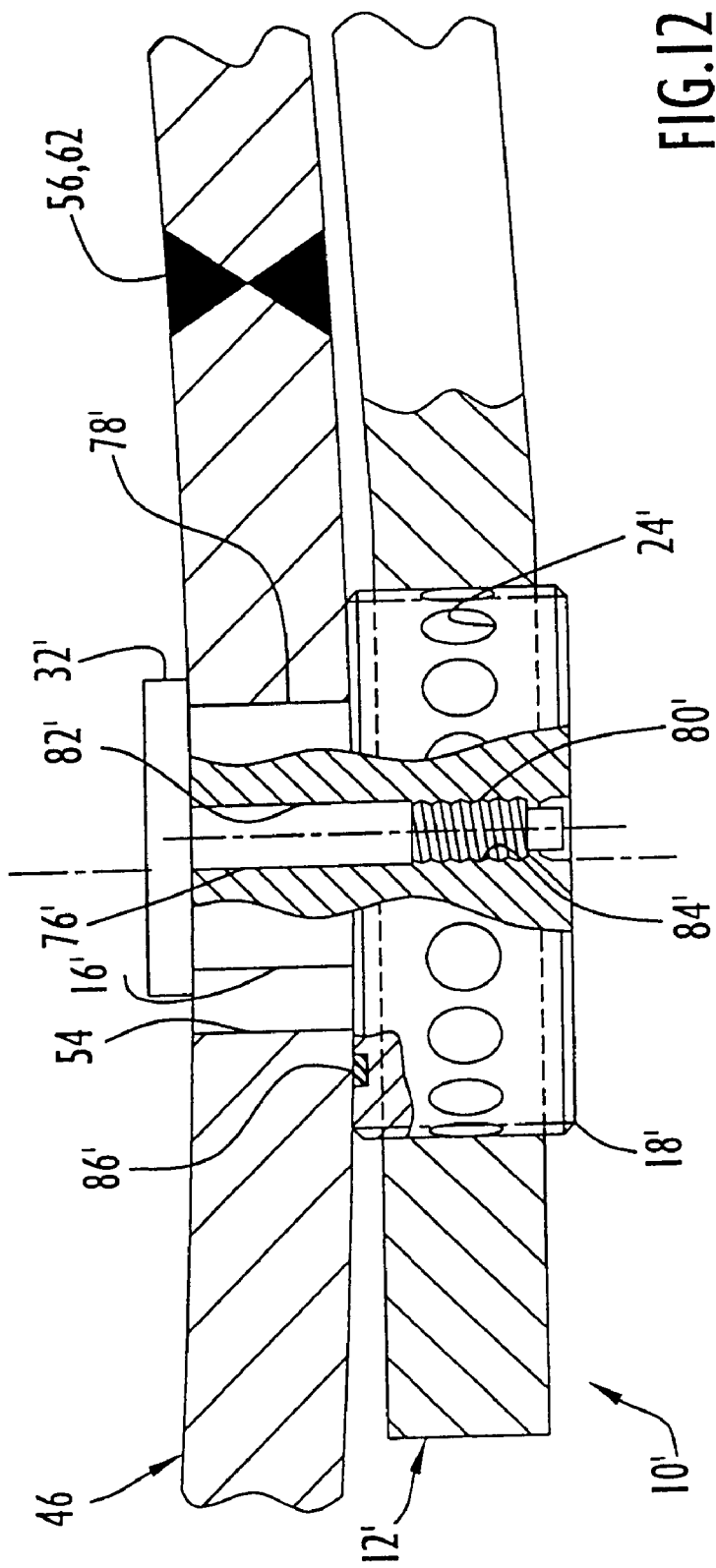
FIG. 12 is fragmentary top view, partly in section, of a modified weld repair clamp installed on a core shroud according to the present invention.

A modification of a weld repair clamp for use in repairing a vertical weld in a boiling water reactor shroud according to the present invention, as shown in FIG. 12 at 10', is similar to the weld repair clamp described above, however, pin flanges 32' of the modified clamp are formed as separate components and secured to disks 18' using bolts 76'. Each bolt 76' includes a round flange 32' with a diameter larger than the main body 78' of the pin, and a threaded shank 80' that extends from the flange through a clearance hole 82' in the main body of the pin to be received in a threaded opening 84' formed in the disk. In the embodiment shown, the threaded opening 84' extends to the outboard face of disk 18', and the outboard end of shank 80' is configured to mate with a tool so that the bolt can be tightened from outside the shroud after the pins have been installed in the shroud openings. Some examples of the types of mating configurations that can be formed at outboard ends of the bolts include, but are not limited to, square shanks and polygonal recesses or sockets. If desired, the outboard end of the bolt can also be provided with a locking cup to allow crimp locking. As seen in FIG. 12, a seal 86' can be positioned between the clamp and the outer surface of the shroud; however, the use of a tightening bolt eliminates the need for seal compliance since the pin can be tightened against the shroud to close any gaps due to variations in shroud thickness.

The disk can be threaded into holes formed in the clamp plate as shown and described above or mounted for rotation relative to the plate in any other suitable manner. For example, in FIGS. 13–16, another modification of a wedge repair clamp according to the present invention is shown wherein the disk mounts the clamp plate like a bayonet. Modified wedge repair clamp 10" is similar to the wedge repair clamps described above; however, pin 16" is threaded into disk 18", holes 14" in clamp plate 12" are formed with annular lips 88" that extend partly around the circumference of the hole along the outboard edge, and the disks are formed with annular flanges 90" that extend partly around the circumference of the disk to fit in the space between terminal ends of the lips so as to allow the disks to be inserted into the clamp plate holes. In the embodiment shown in FIGS. 17 and 18, the annular lip on the right hole extends about 145° in the clockwise direction from a first terminal end near the top of the hole to a second terminal end spaced about 115° counterclockwise from the first terminal end. The hole shown on the left in FIGS. 17 and 18 is a mirror image of the hole on the right and includes an annular lip that extends about 145° in the counterclockwise direction from a first terminal end near the top of the hole to a second terminal end spaced about 115° clockwise from the first terminal end. As in the other clamp plates, ends of the plate 12" are bent inwardly to conform generally to the curvature of the shroud and threaded holes 22" extend downwardly from the top edge of the plate to holes 14" to receive set screws 20" as described above. In addition, circular seal members or rings 92" protrude from the inboard face of clamp plate 12" around holes 22" and have a curved inboard surface 94" with a radius of curvature commensurate with the radius of curvature of the exterior of the shroud (e.g., about 89.5 inches) to form a seal therewith when the flange 32" at the inboard end of pin 16" is tightened against shroud 46.

Figure 20:
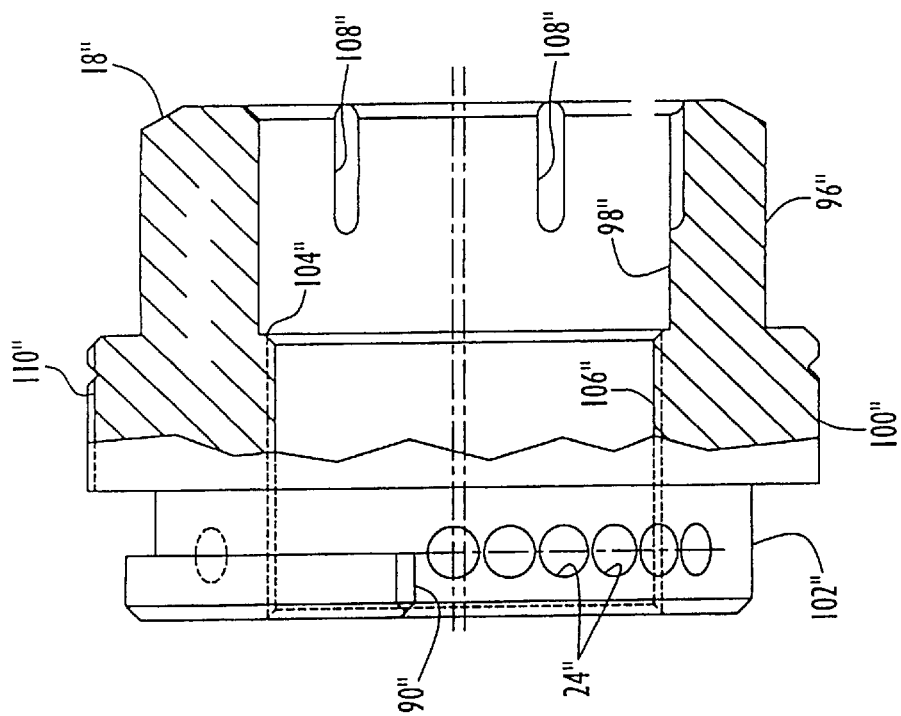
FIG. 20 is a side view, partly in section, of the disk shown in FIG. 19.
Figure 19:
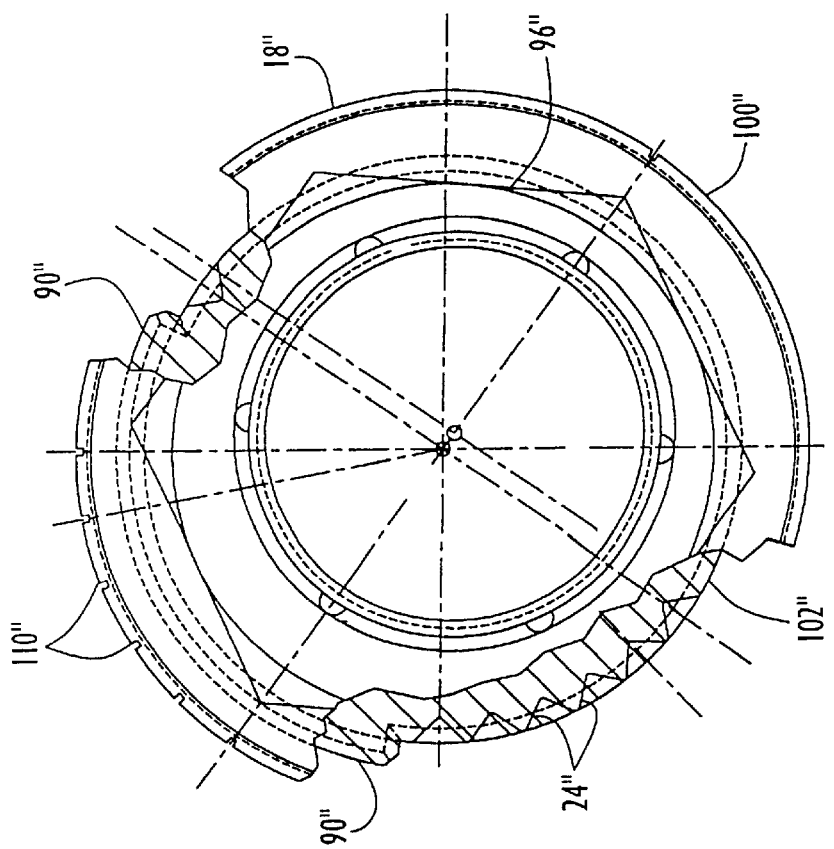
FIG. 19 is an inboard break-away view of a disk that forms part of the modified weld repair clamp of FIG. 13.
Figure 22:
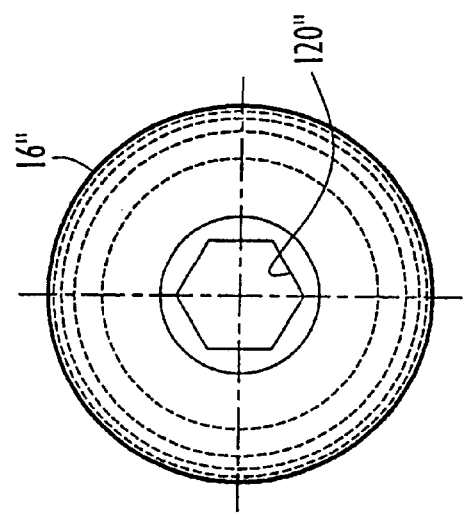
FIG. 22 is an end view of the pin shown in FIG. 21.
Figure 21:
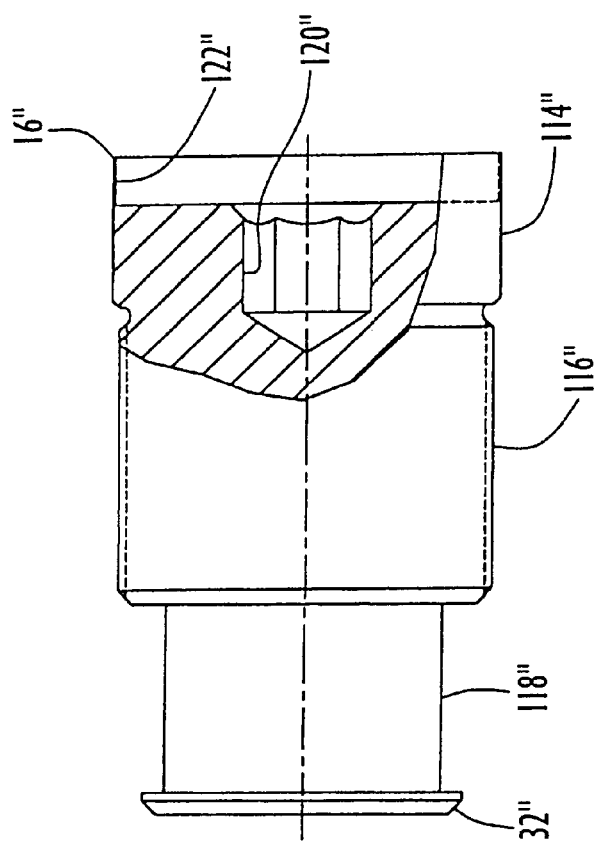
FIG. 21 is a side view, partly in section, of a pin that forms part of the modified weld repair clamp of FIG. 13.

Disk 18" of the modified weld repair clamp 10" includes an outboard portion 96" in the form of a hexagonal head defining a first cylindrical recess 98", an intermediate portion 100" in the form of a round flange extending radially outward from the inboard end of the hexagonal head, and an inboard portion 102" of generally cylindrical configuration with an outwardly extending annular flange 90" configured to fit through the open space between terminal ends of the annular lip 88" to mate with plate 12" like a bayonet. The first cylindrical recess 98" extends in an inboard direction to a radial step or shoulder 104" connecting the first cylindrical recess with a second cylindrical recess 106" of smaller diameter that extends through the intermediate and inboard portions of the disk and is internally threaded. As best seen in FIGS. 19 and 20, grooves 108" can be formed axially along inner walls of the first recess to accommodate locking cups. In the embodiment shown in FIGS. 19 and 20, annular flange 90" extends about 110° about the circumference of the inboard portion of disk 18", however, other circumferential lengths can be used. A plurality of recesses 24" are formed at spaced locations about the outer circumference of the inboard portion to receive a set screw 20" once the weld repair clamp has been properly adjusted. In addition, a plurality of indexing marks in the form of slots 110" are positioned on the outer circumference of the intermediate portion at angularly spaced locations for comparison with a reference mark 112" on the outboard face of the clamp plate to provide a point of reference for determining the position of the pin. In the embodiment shown, six marks in the form of slots are spaced about 11° apart, however, any type or number of marks can be used with any convenient spacing therebetween.

Pin 16" of the modified weld repair clamp 10" includes an outboard portion 114" of generally cylindrical configuration adapted to fit within the first cylindrical recess in disk 18", an intermediate portion 116" of cylindrical configuration with external threads configured to be received within the second cylindrical recess in the disk, and an inboard portion 118" of cylindrical configuration configured to fit through an opening formed in the shroud and terminating at a round flange 32" of larger diameter than the cylindrical portion. A socket or recess 120" is formed in the outboard face of the pin to receive a tool for turning the pin.

Weld repair clamp 10" is assembled by threading each pin 16" into a disk 18" so that flange 32" at the inboard end of each pin protrudes from the disk a distance slightly greater than the thickness of the shroud, and inserting inboard portions 102" of the disks into holes 14" formed in clamp plate 12". Annular flanges 90" are aligned with the annular space between terminal ends of lips 88" so that the disk can be inserted into holes 14", and the disks are then rotated slightly within the holes so that the annular lips are sandwiched between the flanges and intermediate portions of the disks as shown in FIG. 14 to prevent the disks from falling out of the holes. After openings are formed in the shroud as described above, pins 16" are inserted into the openings and rotated about their respective eccentric axes by turning disks 18" in holes 14". Movement of the pins toward the weld can be monitored by comparing slots 110" against reference markings 112" on the outboard face of clamp plate 12". When the pins are appropriately adjusted, flanges 32" are tightened against the inner surface of the shroud using socket 120" at the outboard end of the pin to turn the pin. Pins 16" can be locked in place relative to disks 18" using locking cups 122" on the outboard ends of the pins, and the disks can be locked in place using set screws 20" in the manner described above.

From the above, it will be appreciated that vertical welds in a boiling water reactor shroud can be repaired according to the present invention by inserting eccentrically mounted pins of a clamp through openings in the shroud on opposite sides of the weld and turning the pins toward one another such that the clamp provides a structural load path to transmit all structural loads across the cracked vertical weld. While the repair can function as a permanent solution to the problem of cracking in vertical welds, the relatively simple installation and low cost associated with the repair makes it an attractive choice as a contingency to prepare for other types of repairs.

The openings formed in the shroud are preferably round or pear shaped but can have any suitable configuration providing a surface against which the pins can act. While shroud openings in the form of through holes have been shown and described, it will be appreciated that the openings need not penetrate completely through the shroud. Electrical discharge machining (EDM) or any other known methods of in-vessel machining can be used to form the openings.

As mentioned above, one or more seal members can be positioned between the clamp and the shroud to limit leakage through the openings in the shroud. The seal member or members can be positioned between any portion of the clamp and the shroud including, but not limited to, the disk and the clamp plate. Some examples of the types of seal members that can be used include metal lip seals, piston rings and "O" rings. If desired, the pins and/or the seal members can be spring loaded to help keep the clamp tight against the shroud to aid in vibration adequacy. Adequate compression of the seals can also be accomplished by providing pin flanges which can be tightened against the shroud.

While the weld repair clamp according to the present invention has been shown and described as being used to repair cracks along vertical welds of a core shroud, it will be appreciated that the clamp can also be used to repair cracks along horizontal welds simply by forming openings on opposite sides of a horizontal weld and orienting the clamp so that the pins fit in the openings. Because of the relatively large span of the clamp (i.e., the space between shroud openings), the clamp can also be used to repair cracks in the shroud adjacent the welds as well as cracks in other parts of the shroud remote from any welds.

While a single clamp is shown for repairing a weld, it will be appreciated that plural clamps can be installed along a single weld and/or distributed among many welds depending upon the condition of the shroud. In the event of significant cracking of both vertical and horizontal welds in a core shroud, the clamps can be used in combination with tie rods which axially compress the shroud to ensure sufficient shear load transfer at the horizontal welds. The weld repair clamp according to the present invention can be used in combination with any type of tie rod including, but not limited to, any of the tie rods shown and described in U.S. Pat. Nos. 5,402,570, 5,577,083, and 5,600,689, the disclosures of which are incorporated herein by reference.

The clamp plate can be fabricated from any suitable material but is preferably formed of Type 304, 316 or 347 stainless steel which has been solution annealed and rapid quenched. The pin assemblies can be fabricated from any suitable material but are preferably fabricated from higher strength materials such as, for example, XM-19 or Inconel X-750.

The dimensions listed above are merely exemplary and can be varied dependent upon various factors such as reactor design, the location of the weld to be repaired, and the materials used in fabricating the weld repair clamp. The eccentricity is chosen to accommodate a worst case sum of all tolerances as well as the required engagement of the pin and the shroud. The total range of adjustment is equal to the total pin travel which is twice the eccentricity or offset. If only one pin is mounted for rotation about an eccentric axis, the total range for pin adjustment is equal to the pin travel for that one pin. If both pins are mounted for rotation about respective eccentric axes, the total range is the sum of the pin travel for both pins. The features of the various embodiments described above can be combined in any desired manner.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A method of repairing a weld in a boiling water reactor shroud using a clamp with a pair of pins connected by a structural member, said method comprising the steps of forming a pair of openings in the shroud on opposite sides of the weld;

inserting a pin into each opening in the shroud;

moving at least one of the pins toward the weld from a rest position to an engaged position by rotating the pin about an axis of rotation offset from a central longitudinal axis of the pin so that the pins are positioned to transmit loads from the shroud to the structural member.

2. A method as recited in claim 1 wherein said step of forming a pair of openings includes forming a circular opening through the shroud.

3. A method as recited in claim 1 wherein said step of forming a pair of openings includes forming an opening of decreasing diameter in the direction of the weld.

4. A method as recited in claim 1 wherein at least one of the pins protrudes from a disk with an annular flange extending part way therearound, and said step of forming a pair of openings includes forming an annular lip part way around at least one of the openings to receive the disk.

5. A method as recited in claim 4 wherein said step of inserting a pin into each opening includes inserting the annular flange of the disk in the space between terminal ends of the annular lip formed part way around the opening and rotating the disk so that the annular flange and annular lip overlap to retain the disk in the opening.

6. A method as recited in claim 1 wherein at least one of the pins includes a flange at an inboard end, and wherein the flange engages an inner surface of the shroud when at least one of the pins is rotated.

7. A method as recited in claim 6 wherein the at least one pin with the flange is threaded into a disk rotatably mounted on the structural member, and further comprising the step of tightening the flange against the inner surface of the shroud by turning the pin.

8. A method as recited in claim 1 and further comprising the step of locking at least one of the pins in the engaged position.

9. A method as recited in claim 8 wherein the at least one locked pin protrudes from a disk with circumferentially spaced recesses rotatably mounted on the structural member, and said step of locking the pin includes locking the disk by tightening a set screw into one of the recesses.

10. A method as recited in claim 1 wherein at least one of the pins is mounted on a disk and indexing marks are formed at angular intervals on the disk, and further comprising the step of using the indexing marks to determine the amount of movement of the at least one pin.

11. A method as recited in claim 1 and further comprising the step of positioning a seal member between the clamp and the outer surface of the shroud around at least one of the openings.

12. A method as recited in claim 1 wherein said step of forming a pair of openings includes forming the openings equidistant from the weld.

13. A method as recited in claim 1 wherein said step of forming a pair of openings includes forming the openings at different distances from the weld.

* * * * *